US011259093B2

(12) United States Patent
Nasir

(10) Patent No.: US 11,259,093 B2
(45) Date of Patent: Feb. 22, 2022

(54) SYSTEMS AND METHODS FOR AUTOMATICALLY OUTPUTTING A REPLY TO A MESSAGE RELATING TO A MEDIA ASSET A USER IS CURRENTLY WATCHING WHEN THE USER'S DEVICE IS ON A DO-NOT-DISTURB MODE

(71) Applicant: Rovi Guides, Inc., San Jose, CA (US)

(72) Inventor: Sahir Nasir, San Jose, CA (US)

(73) Assignee: ROVI GUIDES, INC., San Jose, CA (US)

( * ) Notice: Subject to any disclaimer, the term of this patent is extended or adjusted under 35 U.S.C. 154(b) by 42 days.

(21) Appl. No.: 16/818,553

(22) Filed: Mar. 13, 2020

(65) Prior Publication Data

US 2020/0288207 A1 Sep. 10, 2020

Related U.S. Application Data

(63) Continuation of application No. 16/399,299, filed on Apr. 30, 2019, now Pat. No. 10,631,056, which is a continuation of application No. 15/914,561, filed on Mar. 7, 2018, now Pat. No. 10,321,195.

(51) Int. Cl.
*H04N 21/4788* (2011.01)
*H04N 21/8405* (2011.01)
*H04N 21/488* (2011.01)
*H04N 21/466* (2011.01)
*H04N 21/414* (2011.01)
*H04N 21/45* (2011.01)
(Continued)

(52) U.S. Cl.
CPC ..... *H04N 21/4788* (2013.01); *G06F 16/7867* (2019.01); *H04N 21/41407* (2013.01); *H04N 21/44218* (2013.01); *H04N 21/4532* (2013.01); *H04N 21/4668* (2013.01); *H04N 21/4882* (2013.01); *H04N 21/8405* (2013.01)

(58) Field of Classification Search
CPC ......... H04N 21/4788; H04N 21/41407; H04N 21/4532; H04N 21/4882; H04N 21/8405; G06F 17/3082
See application file for complete search history.

(56) References Cited

U.S. PATENT DOCUMENTS

2012/0297437 A1* 11/2012 Blank ............... H04N 21/4394
725/116
2013/0278414 A1* 10/2013 Sprigg ............... G08B 21/0453
340/539.12

(Continued)

*Primary Examiner* — Chenea Davis
(74) *Attorney, Agent, or Firm* — Haley Guiliano LLP

(57) ABSTRACT

Systems and methods are provided herein for receiving, at a first device of a first user, a message from a second device of a second user, and determining that the first user device is programmed to refrain from alerting the first user to the message. In response to determining that the first user device is programmed to refrain from alerting the first user to the message, the systems and methods determine whether the message is related to a media asset that the first user is presently viewing. In response to determining that the message is related to a media asset that the first user is presently viewing, the systems and methods alert the first user to the message, notwithstanding that the first user device is programmed to refrain from alerting the first user to the message.

20 Claims, 11 Drawing Sheets

(51) Int. Cl.
*G06F 16/78* (2019.01)
*H04N 21/442* (2011.01)

(56) References Cited

U.S. PATENT DOCUMENTS

| | | | | |
|---|---|---|---|---|
| 2014/0241517 A1* | 8/2014 | Varoglu | ............... | H04L 51/24 379/201.01 |
| 2014/0344848 A1* | 11/2014 | Busse | ............... | H04N 21/466 725/28 |
| 2018/0255014 A1* | 9/2018 | Dunne | ............... | H04L 51/24 |

* cited by examiner

SYSTEMS AND METHODS FOR AUTOMATICALLY OUTPUTTING A REPLY TO A MESSAGE RELATING TO A MEDIA ASSET A USER IS CURRENTLY WATCHING WHEN THE USER'S DEVICE IS ON A DO-NOT-DISTURB MODE

BACKGROUND OF THE INVENTION

A user who has a mode on their personal device (e.g., mobile device) to not be disturbed may not realize that messages have been sent to their personal device, thus causing significant delay in knowing to respond to those messages. While generic automatic responses to messages are in the related art, generic automatic responses do not account for media content that the user may be viewing. Further, these related art systems and methods do not account for media content that the user may have discussed previously with the sender of the messages.

SUMMARY

Accordingly, systems and methods are provided herein for, when a first user receives a message from a second user while the first user's device is set to a do-not-disturb mode, automatically outputting a reply to the second user if the message relates to media discussed in a conversation previously held between the two users. For example, to determine whether the message relates to media discussed in a conversation previously held between the two users, keywords from the message may be compared with keywords from a transcription of a previous conversation between the users. The previous conversation that is transcribed may be selected from conversations that have occurred within a threshold period of time before the present point in time. If there is a match between the keywords from the message and the keywords from the conversation transcription, a recommendation related to content of the message from the second user to the first user may be determined and transmitted to the second user's device. In one example, where the message is determined to contain a spoiler for an episode that the first user has not yet viewed, the recommendation may be for the second user to recall the message.

Systems and methods are also provided herein for, when a first user receives a message from a second user while the first user's device is set to a do-not-disturb mode, alerting the first user to the message if the message relates to a media asset that the first user is viewing at the time when the message is received. For example, it may be determined whether the first user is viewing the media asset at the time when the message is received by determining whether the media asset is playing back on a device of the first user's. If the first user is viewing the media asset at the time, it may be determined whether the message relates to the media asset. For example, keywords from the message may be compared with keywords retrieved from a database that describe the media asset. If there is a match, meaning that the message relates to the media asset, and if the first user is viewing the media asset, the first user may be alerted to the message despite the device on which the message was received being set to a do-not-disturb mode.

In some aspects of the disclosure, systems and methods are provided herein for, when a message intended to be read by a first user of a first device is received at the first device from a second device of a second user when the first device is programmed to refrain from alerting the first user to the message, automatically outputting a reply to the second user if the message relates to a conversation determined to have occurred between the first user and the second user. For example, if two users spoke or exchanged electronic messages about an episode of "Stranger Things," and the message sent from one user to the other is describing an episode of "Stranger Things," then an automatic message including a recommendation may be automatically transmitted to the sender of the message if the recipient of the message is unable to respond.

In some embodiments, a media guidance application receives, at the first device, the message, from the second device of the second user. For example, a device of the first user receives an email from a device of the second user. The media guidance application may determine that the first device is programmed to refrain from alerting the first user to the message. For example, the first device may be a mobile device with a do-not-disturb mode, or a silent mode, set.

In some embodiments, in response to determining that the first device is programmed to refrain from alerting the first user to the message, the media guidance application may extract a keyword from the message and access a database comprising a transcription of a conversation between the first user and the second user. For example, the keyword may be any word or words that are part of the message, and the transcription of the conversation may be a part of, or an entirety of, the words spoken between the first and second users during a conversation.

In some embodiments, the media guidance application compares the keyword from the message to a keyword of the transcription that is related to a media asset. For example, the media guidance application may compare the keyword from the message to the keyword of the transcription that is related to the media asset by comparing each respective keyword of the transcription to keywords indicated by a database of terms related to media assets, and determining whether a respective keyword of the transcription matches a term related to a media asset of the media assets. In response to determining that the respective keyword matches the term, the media guidance application may determine that the keyword from the message matches the respective keyword of the transcription that matches the term.

Moreover, in some embodiments, the media guidance application may, further in response to determining that the respective keyword matches the term, determine whether a term adjacent to the term is associated with a negative connotation, and in response to determining that the term adjacent to the term is associated with a negative connotation, the media guidance application may refrain from comparing the keyword from the message to the respective keyword of the transcription that matches the term. For example, if the first and second users were discussing that the users do not like the media asset, then the media guidance application may determine that it is unlikely the first user would have wanted to reply with a recommendation relating to the media asset to the second user if the second user transmits a message about the media asset.

In some embodiments, the media guidance application may determine, based on the comparing, whether the keyword from the message matches the keyword from the transcription. For example, the media guidance application may determine whether the keywords are the same word. In response to determining that the keyword from the message matches the keyword from the transcription, the media guidance application may determine that the message is related to the media asset and that the media asset was previously discussed in a conversation between the first user and the second user.

In some embodiments, the media guidance application, in response to determining that the message is related to the media asset and that the media asset was previously discussed in a conversation between the first user and the second user, determines a recommendation related to content of the message, and transmits the recommendation to the second device. For example, because the first user cannot respond to the message, the media guidance application sends an automated reply with an answer to a question posed by the second user in the message in a return message.

In some embodiments, the media guidance application may determine the recommendation related to content of the message by determining that the media asset is an episode of a series of episodes, and that the content of the message relates to a different episode of the series. The media guidance application may determine whether the first user has viewed the different episode, and, in response to determining that the first user has not viewed the media asset, the media guidance application may set the recommendation to be a recommendation to the second user to recall the message. For example, if the users discussed an episode of a series, but the first user has not yet seen a subsequent episode and the message contains a spoiler about the subsequent episode, then the second user will be given an option to recall the spoiler.

In some embodiments, the media guidance application determines whether the content of the message includes a spoiler of the plot of the different episode. The media guidance application may determine that the recommendation is to be a recommendation to the second user to recall the message further in response to determining that the content of the message includes the spoiler.

In some embodiments, the media guidance application, when determining that the media asset was previously discussed in a conversation between the first user and the second user, determines a present point in time and a point in time at which the conversation occurred. The media guidance application may determine whether the present point in time is within a threshold period of time to the point in time at which the conversation occurred, and, in response to determining that the present point of time is within the threshold period of time, the media guidance application may determine that the media asset was previously discussed in a conversation between the first user and the second user.

In some embodiments, the media guidance application may determine whether, at the time the message is received, the first user is viewing the media asset. In response to determining that, at the time the message is received, the first user is viewing the media asset, the media guidance application may alert the first user to the message notwithstanding that the first device is programmed to refrain from alerting the first user to the message. For example, the media guidance application may enable a push notification to be viewed by the first user relating to the message despite the first user having silenced push notifications, due to the notification relating to a media asset that the first user is currently viewing.

In some embodiments, the media guidance application, when determining whether, at the time the message is received, the first user is viewing the media asset, performs the determination by querying a media display device of the first user to determine a given media asset that the media display device is presently generating for display, and determining whether the given media asset is the media asset. In response to determining that the given media asset is the media asset, the media guidance application determines that, at the time the message is received, the first user is viewing the media asset.

In some embodiments, the media guidance application may determine whether, during a predetermined period of time from the alerting, the first user has not responded to the message. In response to determining that, during the predetermined period of time from the alerting, the first user has not responded to the message, the media guidance application may transmit the recommendation to the second device.

In some embodiments, the media guidance application may determine whether a second message comprising content relating to the media asset is received subsequent to transmitting the recommendation to the second device. In response to determining that the second message is received, the media guidance application may refrain from alerting the first user to the second message.

In some aspects of the disclosure, systems and methods are provided herein for alerting the first user to the message if the message relates to a media asset that the first user is viewing at a time when the message is received. For example, if the first user is viewing an episode of the thriller series "Stranger Things" and receives a message on their device that is related to "Stranger Things," the first user may be alerted to the message.

In some embodiments, a media guidance application may receive, at the first device, the message from the second device. For example, a device of the first user may receive a Short Message Service (SMS) message from a device of the second user. The media guidance application may determine that the first device is programmed to refrain from alerting the first user to the message. For example, the first device may be a mobile device that is set to a mode in which the device is commanded to refrain from providing push notifications to the user while the mode is enabled (e.g., a do-not-disturb or silent mode).

In some embodiments, in response to determining that the first device is programmed to refrain from alerting the first user to the message, the media guidance application may determine whether the first user is viewing the media asset. For example, the media guidance application may, in response to determining that the first device is a mobile device set to, e.g., a do-not-disturb mode, determine that the user is currently viewing the episode of "Stranger Things."

In some embodiments, the media guidance application may determine whether the first user is viewing the media asset by determining whether the media asset is playing back at the first device. In response to determining that the media asset is playing back at the first device, the media guidance application may determine that the first user is viewing the media asset. For example, the media guidance application may determine that the first user is watching the episode of "Stranger Things" by determining that the episode of "Stranger Things" is playing back at the first user's mobile device.

In some embodiments, the media guidance application may determine whether the first user is viewing the media asset by, in response to determining that the media asset is not playing back at the first device, determining whether the media asset is playing back at a third device of the first user. The media guidance application may, in response to determining that the media asset is playing back at a third device of the first user, determine that the first user is viewing the media asset. For example, the media guidance application may determine that the episode of "Stranger Things" is not playing back at the first user's mobile device and, in response to determining that the episode of "Stranger Things" is not playing back at the first user's mobile device, determine whether the episode of "Stranger Things" is playing back at another device of the first user. The media guidance application may determine that "Stranger Things" is playing back on a set-top box of the first user and may thereby determine that the first user is viewing "Stranger Things."

In some embodiments, the media guidance application may determine whether the media asset is playing back at a third device by retrieving an entry from a profile of the first user, determining from the entry a plurality of devices of the first user, and determining that the third device is indicated as a device in the plurality of devices by the entry. In response to determining that the third device is indicated as a device in the plurality of devices by the entry, the media guidance application may determine whether the media asset is playing back at the third device. For example, the media guidance application may retrieve an entry from a profile of the first user that identifies a mobile device, a set-top box, and a tablet computer as devices of the first user. The media guidance application may determine that the set-top box is listed in the identified device list and determine whether "Stranger Things" is playing back at the set-top box.

The media guidance application may, in response to determining that the first user is viewing the media asset, extract a keyword from the message and retrieve keywords from a metadata entry in a database, where the metadata entry includes metadata describing the media asset. For example, in response to determining that the user is currently viewing the episode of "Stranger Things," the media guidance application may extract a keyword from the SMS message received by the first user's mobile device and retrieve keywords from a metadata entry in a database that includes metadata describing the episode of "Stranger Things." The media guidance application may extract the keyword from the SMS message using, for example, a named-entity recognition or natural language processing algorithm.

The media guidance application may compare the keyword from the message to the keywords from the metadata entry and determine, based on the comparing, whether the keyword from the message matches a keyword of the keywords from the metadata entry. For example, the media guidance application may compare the extracted keyword from the SMS message received by the first user's mobile device with each of the keywords retrieved from the metadata entry in the database that includes metadata describing the episode of "Stranger Things."

In response to determining that the keyword from the message matches the keyword of the keywords from the metadata entry, the media guidance application may determine that the message relates to the media asset.

In response to determining that the message relates to the media asset, the media guidance application may alert the first user to the message notwithstanding that the first device is programmed to refrain from alerting the first user to the message. For example, in response to determining that there is a match between the extracted keyword and one of the retrieved keywords, the media guidance application may determine that the SMS message received by the first user's mobile device relates to "Stranger Things" and alert the first user to the message, notwithstanding that the first user's mobile device is set to a do-not-disturb mode.

In some embodiments, the media guidance application may alert the first user to the message, notwithstanding that the first device is programmed to refrain from alerting the first user to the message, by determining that the media asset is an episode of a series of episodes and that the content of the message relates to a different episode of the series. The media guidance application may determine whether the first user has viewed the different episode, and, in response to determining that the first user has not viewed the different episode, refrain from alerting the first user to the message and transmit a recommendation to the second device for the second user to recall the message. For example, the media guidance application may, having determined that the media asset is an episode of "Stranger Things," determine that the content of the SMS message received by the first user's mobile device relates to a different episode of "Stranger Things." The media guidance application may check a "Previously Watched" list in a profile of the first user and determine that the first user has not watched the different episode of "Stranger Things." In response to determining that the user has not watched the different episode of "Stranger Things," which the content of the SMS message relates to, the media guidance application may refrain from alerting the first user to the message and transmit a recommendation to the second device for the second user to recall the message.

In some embodiments, the media guidance application may transmit the recommendation to the second device for the second user to recall the message by determining whether the message includes a spoiler of a plot of the different episode. In response to determining that the message includes a spoiler, the media guidance application may transmit the recommendation to the second device for the second user to recall the message. In response to determining that the message does not include a spoiler, the media guidance application may refrain from transmitting the recommendation to the second device for the second user to recall the message. For example, the media guidance application may determine whether the SMS message received at the first user's mobile device includes a spoiler of a plot of the different episode of "Stranger Things." For example, the media guidance application may determine whether the SMS message contains a spoiler by retrieving plot points (such as character names, narrative arc categories, etc.) of the different episode and searching in the SMS message for references to the plot points. The media guidance application may determine that the content of the message includes a spoiler of the plot of the different episode if it finds a reference to one of the plot points in the message. If the media guidance application determines that the message does include a spoiler, it may transmit the recommendation to the second device for the second user to recall the message. If the media guidance application determines that the message does not include a spoiler, it may refrain from transmitting the recommendation.

In some embodiments, the media guidance application may, further in response to determining that the first device is programmed to refrain from alerting the first user to the message, extract a keyword from the message, access a database comprising a transcription of a conversation between the first user and the second user, and compare the keyword from the message to a keyword, of the transcription, that is related to the media asset. For example, further in response to determining that the first user's mobile device is set to a do-not-disturb mode, the media guidance application may extract a keyword from the SMS message received at the first user's mobile device, access a database comprising a transcription of a conversation between the first user and the second user, and compare the keyword extracted from the SMS message with each of the keywords related to "Stranger Things" in the transcription of the conversation between the first user and the second user.

The media guidance application may determine, based on the comparing, whether the keyword from the message matches the keyword from the transcription, and in response to determining this, the media guidance application may determine that the message is related to the media asset and that the media asset was previously discussed in a conversation between the first user and the second user. For example, the media guidance application may determine, based on comparing the keyword extracted from the SMS message with each of the keywords related to "Stranger Things" in the transcription of the conversation between the first user and the second user, whether there is a match, and in response to determining a match, determine that the SMS message received by the first user's mobile device is related to "Stranger Things," and that "Stranger Things" was previously discussed in a conversation between the first user and the second user.

In some embodiments, the media guidance application may alert the first user to the message, notwithstanding that the first device is programmed to refrain from alerting the first user to the message, further in response to determining that the media asset was previously discussed in the conversation between the first user and the second user. For example, the media guidance application may alert the first user to the SMS message, notwithstanding that the first user's mobile device is set to a do-not-disturb mode, further in response to determining that "Stranger Things" was previously discussed in a conversation between the first user and the second user.

In some embodiments, the media guidance application may determine that the media asset was previously discussed in the conversation between the first user and the second user by determining a present point in time, determining a point in time at which the conversation occurred, and determining whether the present point in time is within a threshold period of time to the point in time at which the conversation occurred. In response to determining that the present point in time is within the threshold period of time, the media guidance application may determine that the media asset was previously discussed in a conversation between the first user and the second user.

In some embodiments, the media guidance application may compare the keyword from the message to the keyword, of the transcription, that is related to the media asset, by comparing each respective keyword of the transcription to keywords indicated by a database of terms related to media assets and determining whether a respective keyword of the transcription matches a term related to a media asset of the media assets. In response to determining that the respective keyword matches the term, the media guidance application may compare the keyword from the message to the respective keyword of the transcription that matches the term. For example, the media guidance application may compare each respective keyword of the transcription of the conversation between the first user and the second user with keywords indicated by a database of terms related to media assets, e.g., episodes of "Stranger Things." The media guidance application may determine that a respective keyword of the transcription of the conversation matches a term related to an episode of "Stranger Things" and, in response to determining the match, the media guidance application may compare the keyword extracted from the SMS message received at the first user's mobile device with the respective keyword of the transcription of the conversation that matches a term related to an episode of "Stranger Things."

In some embodiments, the media guidance application may, further in response to determining that the respective keyword matches the term, determine whether a term adjacent to the term is associated with a negative connotation and, in response to determining that the term adjacent to the term is associated with a negative connotation, refrain from comparing the keyword from the message to the respective keyword of the transcription that matches the term. For example, the media guidance application may determine that a term adjacent to the term related to the episode of "Stranger Things" is associated with a negative connotation, indicating, for example, that the message refers to the episode of "Stranger Things" in a negative manner, which the first user may not be interested in seeing immediately. The media guidance application may, in response to determining this, refrain from comparing the keyword from the message to the respective keyword of the transcription that matches the term.

In some embodiments, the media guidance application may determine whether the first user transmits a reply to the message within a threshold period of time from receiving the message. In response to determining that the first user does not transmit the reply to the message within the threshold period of time, the media guidance application may automatically transmit a recommendation relating to the media asset to the second device. For example, the media guidance application may determine whether the first user transmits a reply to the SMS message received by the first user's mobile device within a threshold period of time. In response to determining that the first user does not transmit a reply within the threshold period of time, the media guidance application may automatically transmit a recommendation relating to the media asset to the second device of the second user to, for example, alert the second user that the first user is busy watching "Stranger Things."

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for, when a message intended to be read by a first user of a first device is received at the first device from a second device of a second user when the first device is programmed to refrain from alerting the first user to the message, automatically outputting a reply to the second user if the message relates to a conversation determined to have occurred between the first user and the second user, and/or alerting the first user to the message if the message relates to a media asset that the first user is viewing at a time when the message is received.

Figure 1:
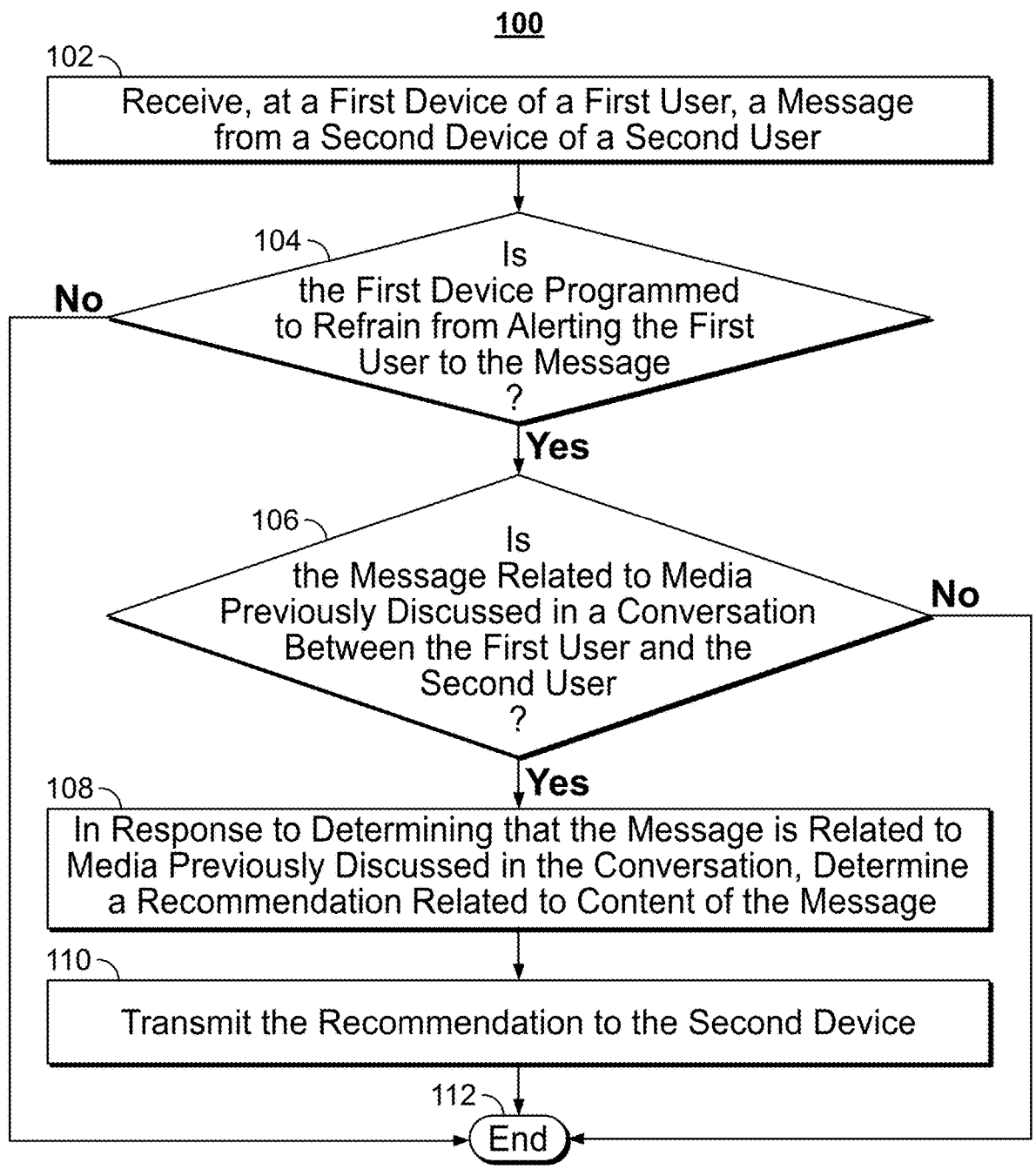
FIG. 1 depicts an illustrative flowchart of a process for, in response to determining that a message is related to media previously discussed in a conversation between the message sender and receiver, transmitting a recommendation to the device of the message sender, in accordance with some embodiments of the disclosure.

FIG. 1 depicts an illustrative flowchart of a process for, in response to determining that a device that a message is received at is programmed to refrain from alerting the message receiver of the message, and that the message is related to media previously discussed in a conversation between the message sender and receiver, transmitting a recommendation to the device of the message sender, in accordance with some embodiments of the disclosure. At 102, control circuitry of a first device of a first user receives a message from a second device of a second user (details relating to control circuitry and other elements of user devices will be described in further detail below with respect to FIGS. 3-6). For example, control circuitry of a second device of the second user may send the message and control circuitry of a first device of the first user may receive the message. At 104, control circuitry determines whether the first user device is programmed to refrain from alerting the first user to the message. If control circuitry determines that the first user device is programmed to refrain from alerting the first user to the message, process 100 proceeds to 106. Otherwise, process 100 proceeds to 112. At 106, control circuitry determines whether the message is related to media previously discussed in a conversation between the first user and the second user. If control circuitry determines that the message is related to media previously discussed in a conversation between the users, process 100 proceeds to 108. Otherwise, process 100 proceeds to 112. At 108, in response to determining that the message is related to media previously discussed in the conversation, control circuitry determines a recommendation related to content of the message. At 110, control circuitry transmits the recommendation to the second device. At 112, process 100 ends.

Figure 2:
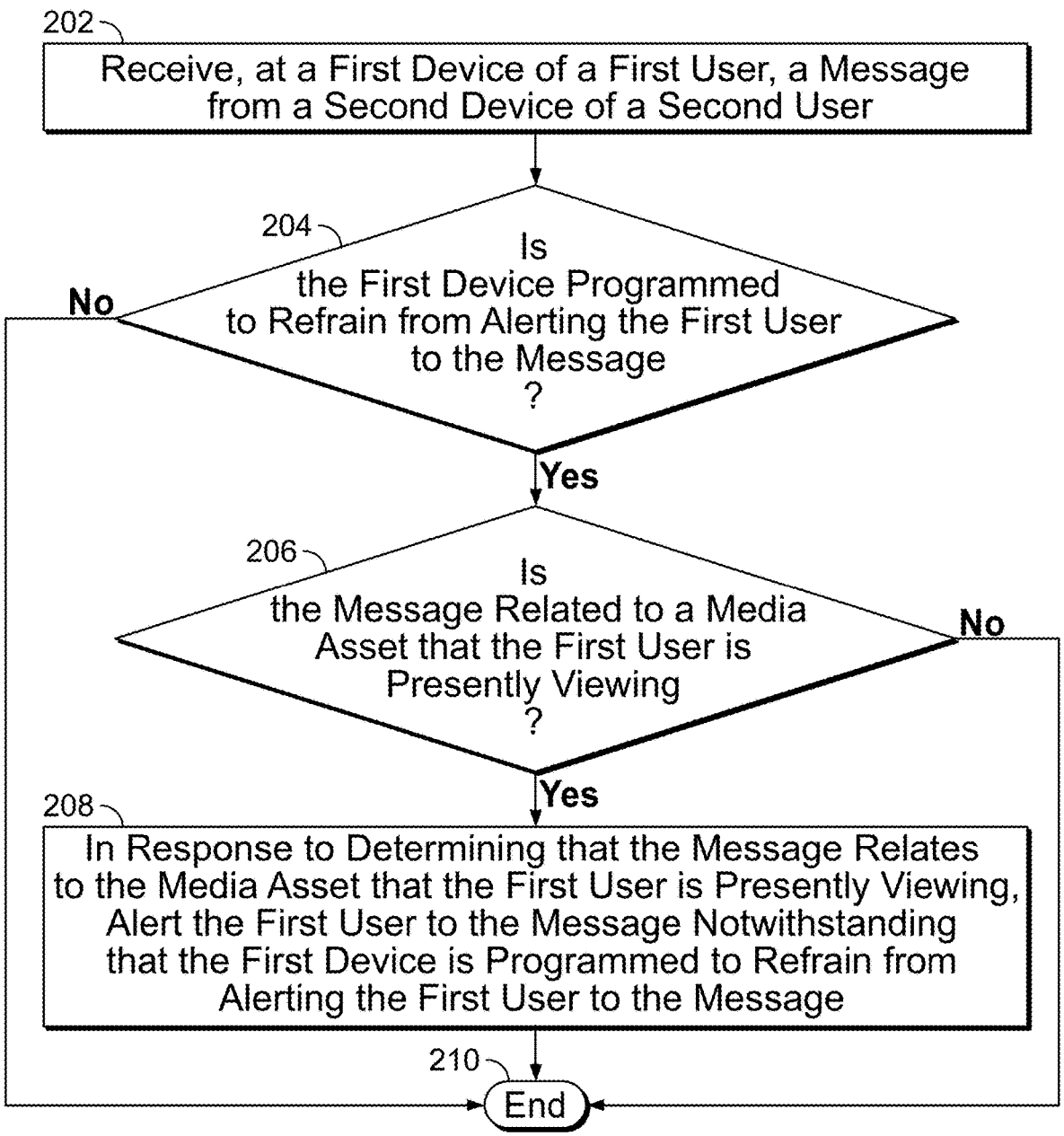
FIG. 2 depicts an illustrative flowchart of a process for, in response to determining that a message is related to the media asset a user is presently viewing, alerting the user to the message, in accordance with some embodiments of the disclosure.

FIG. 2 depicts an illustrative flowchart of a process for, in response to determining that a message is related to the media asset a user is presently viewing, alerting the user to the message, in accordance with some embodiments of the disclosure. At 202, control circuitry of a first device of a first user receives a message from a second device of a second user. For example, a second device of the second user may send the message and a first device of the first user may receive the message. At 204, control circuitry determines whether the first user device is programmed to refrain from alerting the first user to the message. If control circuitry determines that the first user device is programmed to refrain from alerting the first user to the message, process 200 proceeds to 206. Otherwise, process 200 proceeds to 210. At 206, control circuitry determines whether the message is related to a media asset that the first user is presently viewing. If control circuitry determines that the message is related to a media asset that the first user is presently viewing, process 200 proceeds to 208. Otherwise, process 200 proceeds to 210. At 208, in response to determining that the message relates to the media asset that the first user is presently viewing, control circuitry alerts the first user to the message, notwithstanding that the first device is programmed to refrain from alerting the first user to the message. At 210, process 200 ends.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
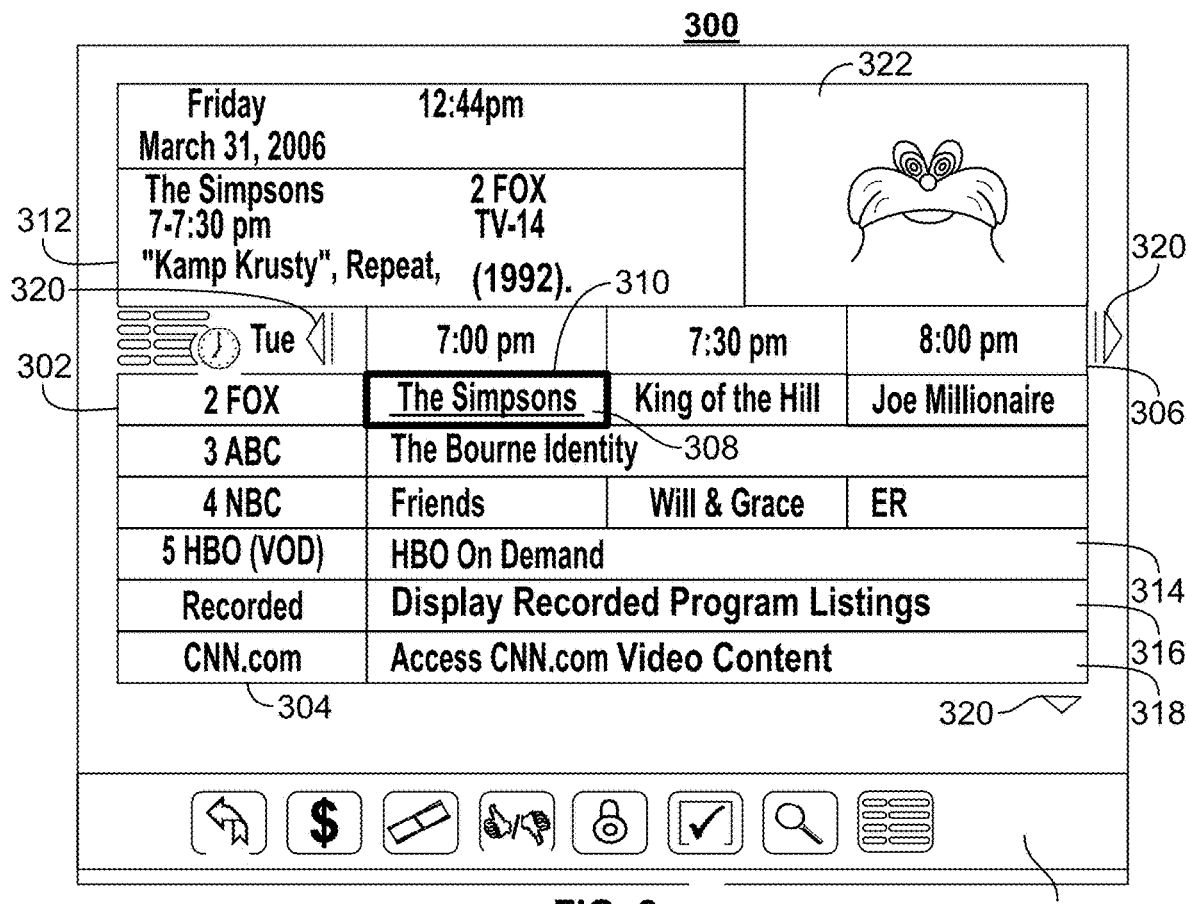
FIG. 3 shows an illustrative embodiment of a display screen that may be used to provide media guidance application listings and other media guidance information, in accordance with some embodiments of the disclosure.
Figure 4:
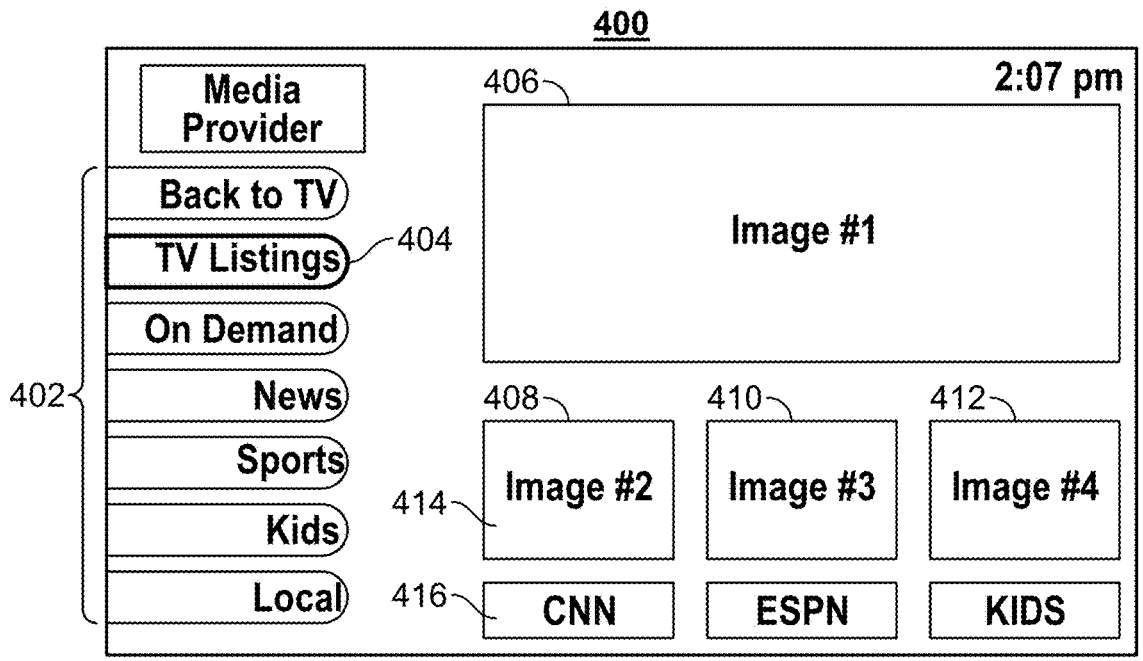
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

There may be an option available, for example in options region 326, to take a snapshot of displayed media content. The displayed media content may include program listings, a television show, a movie, a commercial, and/or other displayed media content. The displayed media content may include embedded content, such as a watermark, QR code, or barcode, that encodes additional information (e.g., a title or other attribute of the displayed media content, a link to an external source for a relevant segment of the displayed media content, etc.). The snapshot of the displayed media content may be saved for future reference, forwarded to friends and family, and/or used for another purpose. In some embodiments, the option to take a snapshot may be available to a user via an on-screen button, on a remote control, on a user input display, and/or via another user input that may be selected by the user.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
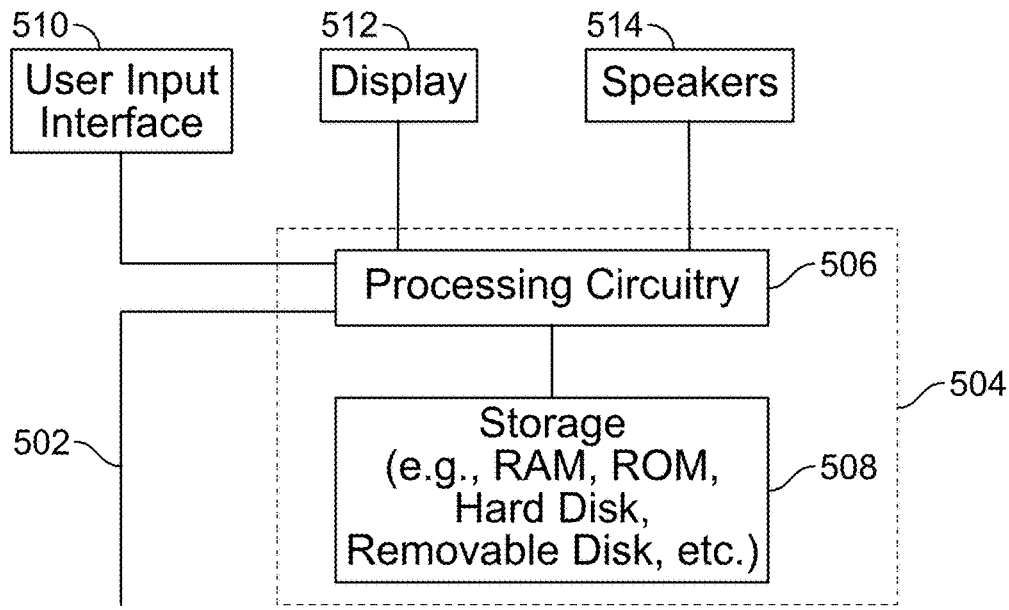
FIG. 5 is a block diagram of an illustrative user equipment (UE) device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
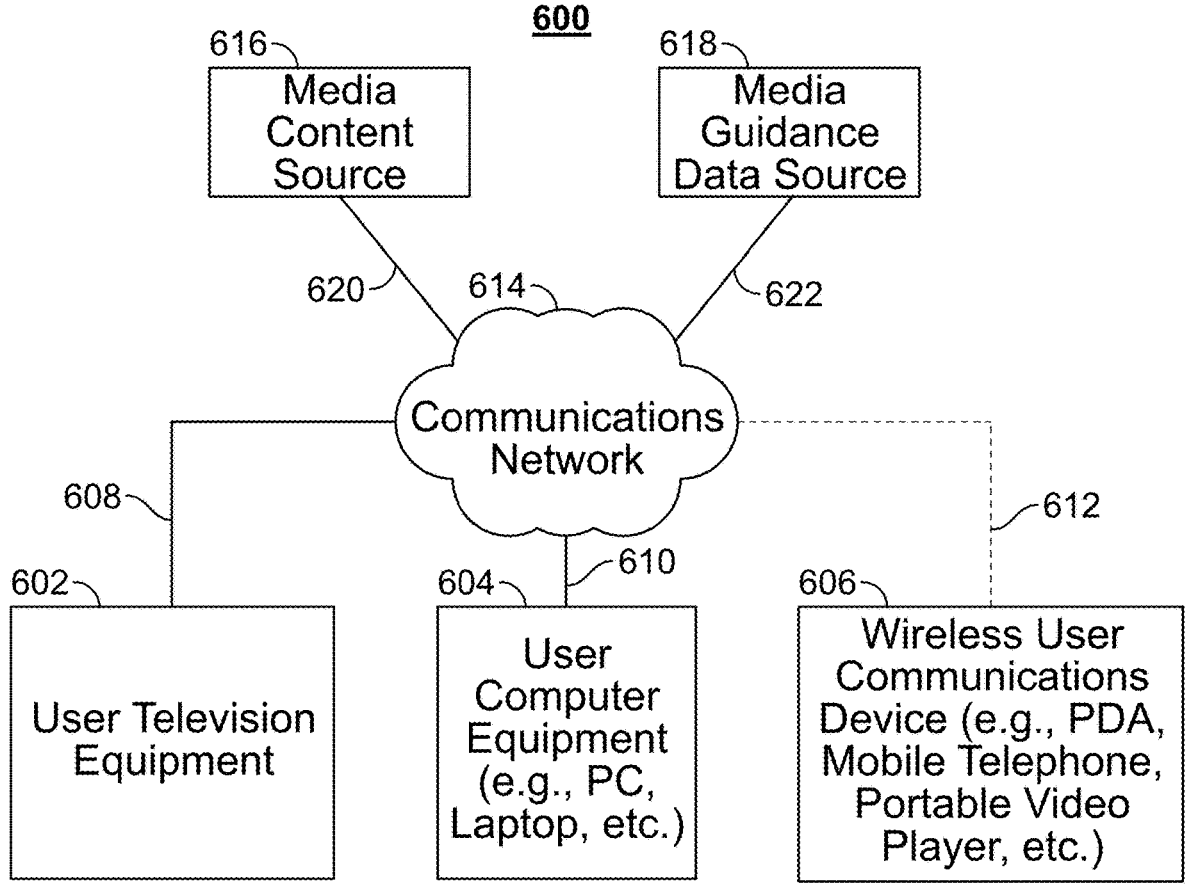
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively.

Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

System 600 may also include an advertisement source 624 coupled to communications network 614 via a communications path 626. Path 626 may include any of the communication paths described above in connection with paths 608, 610, and 612. Advertisement source 624 may include advertisement logic to determine which advertisements to transmit to specific users and under which circumstances. For example, a cable operator may have the right to insert advertisements during specific time slots on specific channels. Thus, advertisement source 624 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 624 may be configured to maintain user information including advertisement-suitability scores associated with user in order to provide targeted advertising. Additionally or alternatively, a server associated with advertisement source 624 may be configured to store raw information that may be used to derive advertisement-suitability scores. In some embodiments, advertisement source 624 may transmit a request to another device for the raw information and calculate the advertisement-suitability scores. Advertisement source 624 may update advertisement-suitability scores for specific users (e.g., first subset, second subset, or third subset of users) and transmit an advertisement of the target product to appropriate users.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
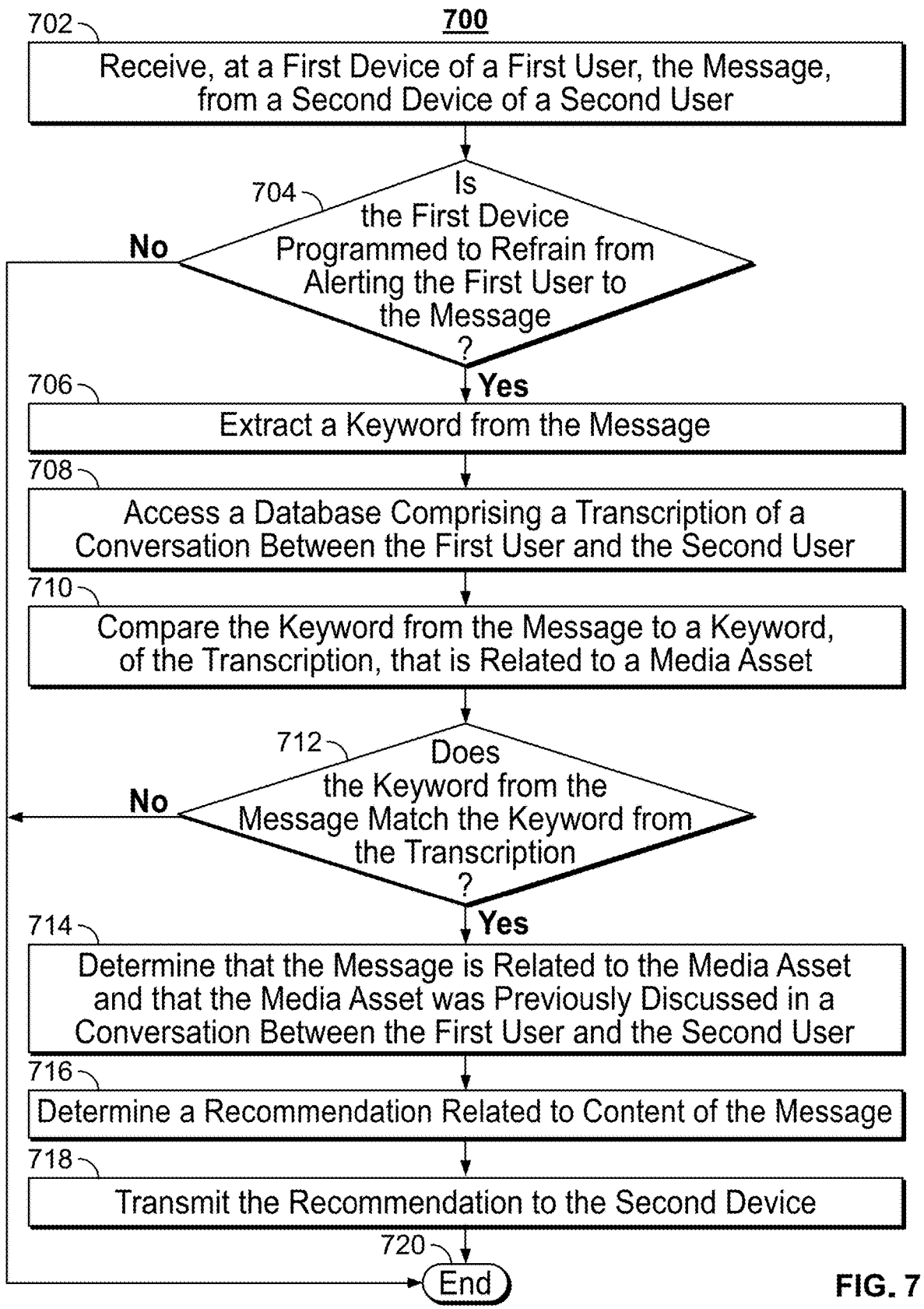
FIG. 7 depicts an illustrative flowchart of a process for, based on determining that a message received at a first device of a first user and sent by a second user is related to a media asset previously discussed between the first user and the second user, transmitting a recommendation to the second user, in accordance with some embodiments of the disclosure.

FIG. 7 depicts an illustrative flowchart of a process for, based on determining that a message received at a first device of a first user and sent by a second user is related to a media asset previously discussed between the first user and the second user, transmitting a recommendation to the second user, in accordance with some embodiments of the disclosure. Process 700 may be executed by control circuitry 504 (e.g., in a manner instructed to control circuitry 504 by the media guidance application). In addition, one or more steps of process 700 may be incorporated into or combined with one or more steps of any other process or embodiment (e.g., as described in relation to FIGS. 8-13).

Process 700 begins at 702, where control circuitry 504 receives a message, at a first device of the first user, from a second device of the second user. In some embodiments, the message comprises user-generated content generated by the second user. For example, the message may be a Short Message Service (SMS) text message, an email, a message transmitted through an application (e.g., Facebook, GroupMe), a voicemail message, or another form of digital communication. The first device and the second device may have any or all of the functionality of user television equipment 602, user computer equipment 604, and wireless user communications device 606. The second device may transmit the message over a protocol such as the Internet's Simple Mail Transfer Protocol (SMTP), Advanced Message Queueing Protocol (AMQP), Message Queue Telemetry Transport (MQTT), or another messaging protocol. In some embodiments, control circuitry 504 may receive the message over communications network 614.

At 704, control circuitry 504 determines whether the first device is programmed to refrain from alerting the user to the message. Alerting the user to the message may include, for example, generating for display a notification (e.g., on user input interface 510 or display 512), generating an audio output (e.g., through speakers 514), causing the device to vibrate, turning on a screen of the device (e.g., on display 512), etc. When the first device is not programmed to refrain from alerting the user to a message, control circuitry 504 may generate for display the message, e.g., on display 512. For example, control circuitry 504 may query the device settings of the first device to determine whether the device is set to, e.g., a do-not-disturb or silent mode. Control circuitry 504 may transmit the query to storage 508, media guidance data source 618, or another location where the device settings of the first device are stored. The query may be transmitted over communications network 614. In one example, after transmitting the query, control circuitry 504 may determine that the first device is programmed to refrain from alerting the user to the message if the control circuitry receives a response to the query indicating that the first device is set to, e.g., a do-not-disturb or silent mode. The do-not-disturb or silent mode may include, for example, notifications being prevented from being generated for display, audio being prevented from being outputted, vibrations of the device being prevented from occurring, a screen of the device being prevented from turning on, etc. For example, control circuitry 504 may receive, in response to the query, a data structure that includes a Boolean value indicating whether the first device is set to a do-not-disturb mode. If control circuitry 504 determines that the first device is programmed to refrain from alerting the user to the message, process 700 proceeds to 706. Otherwise, process 700 proceeds to 720.

At 706, control circuitry 504 extracts a keyword from the message. For example, control circuitry 504 may execute a natural language processing algorithm, such as the Rapid Automatic Keyword Extraction (RAKE) algorithm, to extract the keyword from the message. Methods, systems, and apparatuses for automatic keyword extraction are described in greater detail in Csomai et al. U.S. Pat. No. 8,346,534, issued Nov. 6, 2011, which is hereby incorporated by reference herein in its entirety. In some embodiments, multiple keywords may be extracted from the message. The one or more keywords may be stored, for example, in storage 508.

At 708, control circuitry 504 may access a database comprising a transcription of a conversation between the first user and the second user. In one example, the database comprising the transcription of the conversation may be located in storage 508. In another example, the database may be located at a remote server (e.g., a server associated with media content source 616 or media guidance data source 618) that control circuitry 504 communicates with over communications network 614. In one example, the transcription of the conversation may be a textual log of digital messages sent between the users, such as an archive of emails exchanged between the users, for example. In another example, the transcription of the conversation may be a textual transcription of a verbal conversation that occurred between the users, e.g., over a voice call or video call. The transcription may have been generated by an application on one of the user devices (e.g., an email application generating an archive of email messages).

At 710, control circuitry 504 compares the keyword from the message to a keyword, of the transcription, that is related to a media asset. In some embodiments, control circuitry 504 may select a keyword, of the transcription, that is related to the media asset by retrieving known keywords from a database (e.g., from storage 508 or from a remote server associated with media content source 616 or media guidance data source 618) and may scan the transcription for a keyword that matches one of the known keywords. For example, control circuitry 504 may iterate sequentially through each word in the transcription and compare each respective word in the transcription with the known keywords to detect whether there is a match. If there is a match between a word in the transcription and one of the known keywords, control circuitry 504 may select the word in the transcription as the keyword, of the transcription, that is related to the media asset. After the control circuitry has selected the keyword, of the transcription, that is related to the media asset, it may compare the keyword of the transcription to the keyword extracted from the message at step 706.

At 712, control circuitry 504 determines whether the keyword from the message matches the keyword from the transcription. For example, control circuitry 504 may do a string comparison of the keywords to determine whether the keywords match. If control circuitry 504 determines that there is a match, process 700 proceeds to 714. Otherwise, process 700 proceeds to 720. At 714, in response to control circuitry 504 determining that the keyword from the message matches the keyword from the transcription, control circuitry 504 determines that the message is related to the media asset and that the media asset was previously discussed in a conversation between the first user and the second user.

At 716, control circuitry 504 determines a recommendation related to content of the message. A recommendation may include, for example, a recommendation for related media, a recommendation for a user action, a recommendation relating to the conversation between the two users, etc. In one example, a recommendation may include a snapshot, for example, of displayed media content on the first user device. As described above, the snapshot may include embedded content that causes supplemental content to be included with the recommendation, such as a link to the content. In some embodiments, control circuitry 504 may determine the content of the message by, for example, using the keyword extracted from the message to categorize the content of the message. For example, control circuitry 504 may access a database in storage 508 or media guidance data source 618 to retrieve a data structure that maps possible extracted keywords to content categories. In some embodiments, control circuitry 504 may access a user profile in storage 508 or media guidance data source 618 that indicates user preferences for recommendations based on message content. The preferences may be set by the user, for example, during a system sign-up or initiation process, or the preferences may be automatically set by the media guidance system. Control circuitry 504 may also take into account past user behavior (e.g., by viewing a user profile or past user activity logs) to determine a recommendation. Methods, systems, and apparatuses for populating and accessing user profiles are described in greater detail in Cordray et al. U.S. Pat. App. Pub. No. 2007/0157222, published Jul. 5, 2007, Westberg U.S. Pat. No. 7,984,468, issued Jul. 19, 2011, and Ward, III et al. U.S. Pat. No. 8,635,649, issued May 20, 2014, which are hereby incorporated by reference herein in their entirety. For example, if the first user has previously been slow to respond to messages related to previous conversations, whether the first device of the first user has or has not been set to refrain from alerting the first user to the message, control circuitry 504 may determine the recommendation to be a recommendation for the second user to message the first user at a later time, and may additionally propose scheduling a reminder to do so or an automated message that will be sent out at the later time.

At 718, control circuitry 504 transmits the recommendation to the second device. For example, control circuitry 504 may transmit the recommendation over communications network 614 via communication path 612 to second device 604. The recommendation may be presented on the second device through, for example, a push notification or textual alert on user input interface 510 or display 512. In another example, the recommendation may be presented via an audio alert, for example through speakers 514. At 720, process 700 ends.

Figure 8:
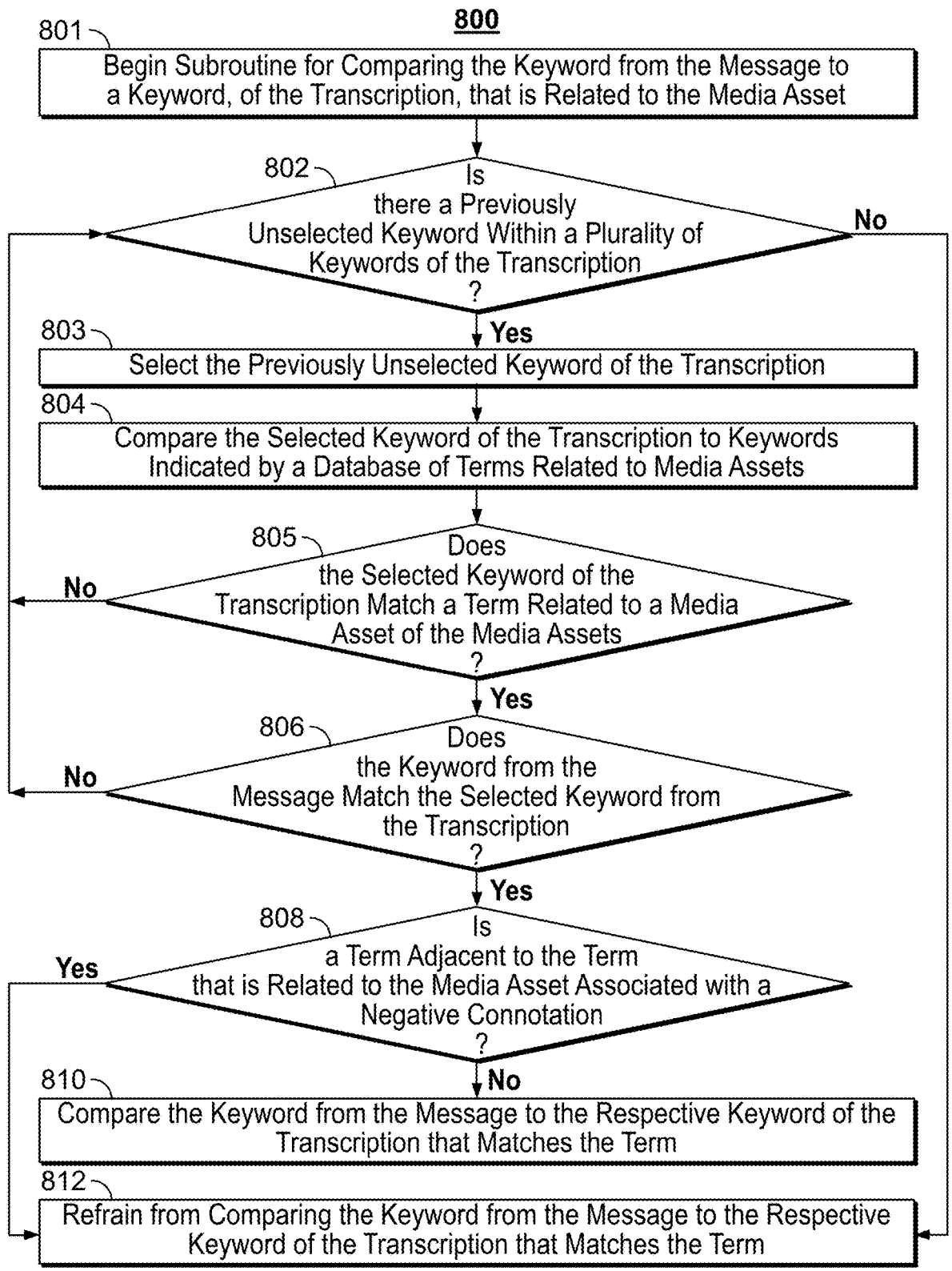
FIG. 8 depicts an illustrative flowchart of a process for comparing a keyword from the message to a keyword, of the transcription, that is related to the media asset, in accordance with some embodiments of the disclosure.

FIG. 8 depicts an illustrative flowchart of a process for comparing a keyword from the message to a keyword, of the transcription, that is related to the media asset, in accordance with some embodiments of the disclosure. Process 800 may be executed by control circuitry 504 (e.g., in a manner instructed to control circuitry 504 by the media guidance application). In addition, one or more steps of process 800 may be incorporated into or combined with one or more steps of any other process or embodiment (e.g., as described in relation to FIGS. 7 and 9-13).

Process 800 begins at 801, where control circuitry 504 begins a subroutine for comparing the keyword from the message to a keyword, of the transcription, that is related to the media asset. At 802, control circuitry 504 determines whether there is a previously unselected keyword within a plurality of keywords of the transcription. For example, control circuitry 504 may select the plurality of keywords of the transcription by executing a natural language processing algorithm, as described above. Control circuitry 504 may iterate through each keyword of the plurality of keywords and determine that there is no previously unselected keyword once it has iterated completely through the plurality of keywords. Control circuitry may iterate through the keywords by, for example, assigning each keyword of the plurality of keywords an index value (e.g., 1, 2, 3, . . . ) and selecting each keyword in order by index. If control circuitry 504 determines that there is a previously unselected keyword within the plurality of keywords of the transcription, process 800 proceeds to 803. Otherwise, process 800 proceeds to 812.

At 803, control circuitry 504 selects the previously unselected keyword of the transcription. For example, control circuitry 504 may select the previously unselected keyword by, as described above, selecting the next keyword in the iteration through the plurality of keywords. At 804, control circuitry 504 compares the selected keyword of the transcription to keywords indicated by a database of terms related to media assets. As described at 710, control circuitry 503 may determine the keywords indicated by the database of terms related to media assets by retrieving known keywords from a database (e.g., from storage 508 or from a remote server associated with media content source 616 or media guidance data source 618) that are associated with media assets, and comparing the keyword of the transcription to the known keywords retrieved from the database.

At 805, control circuitry 504 determines whether the selected keyword of the transcription matches a term related to a media asset of the media assets. For example, control circuitry 504 may do a string comparison between the selected keyword of the transcription and each term related to the media asset to determine a match. If control circuitry 504 determines that the selected keyword of the transcription matches a term related to a media asset of the media assets, process 800 proceeds to 806. Otherwise, process 800 proceeds to 802.

At 806, control circuitry 504 determines whether the keyword from the message matches the selected keyword from the transcription. For example, control circuitry 504 may perform a string comparison between the keyword extracted from the message and the selected keyword from the transcription that matched a term related to a media asset. Control circuitry 504 may detect a match if there is a partial match or full match between the keywords. In some embodiments, control circuitry 504 may use a fuzzy logic method, where control circuitry 504 assigns a value between 0 and 1 that represents how closely the keywords match each other. If the value representing how closely the keywords match each other is above a threshold value, control circuitry 504 may determine that there is a partial match or full match between the keywords. Methods, systems, and apparatuses for determining fuzzy logic values are described in greater detail in Aragon U.S. Pat. No. 5,276,741, issued May 16, 1991, which is hereby incorporated by reference herein in its entirety. If control circuitry 504 determines that the keyword from the message matches the selected keyword from the transcription, process 800 proceeds to 808. Otherwise, process 800 proceeds to 802.

At 808, control circuitry 504 determines whether a term adjacent to the term that is related to the media asset is associated with a negative connotation. For example, control circuitry 504 may determine whether a term adjacent to the term that is related to the media asset (e.g., the term that is directly before the term related to the media asset and/or the term that is directly after the term related to the media asset) is associated with a negative connotation by executing an intent deduction algorithm. Methods, systems, and apparatuses for intent deduction are described in greater detail in Pereg et al. U.S. Pat. App. Pub. No. 2011/0208522, published Aug. 25, 2011, which is hereby incorporated by reference herein in its entirety. In another example, control circuitry 504 may retrieve a database of terms associated with a negative connotation, e.g., from storage 508 or media guidance data source 618, and determine whether a term adjacent to the term that is related to the media asset matches any term within the database of terms associated with a negative connotation. If control circuitry 504 determines that a term adjacent to the term that is related to the media asset is associated with a negative connotation, process 800 proceeds to 812. Otherwise, process 800 proceeds to 810.

At 810, in response to control circuitry 504 determining that a term adjacent to the term that is related to the media asset is associated with a negative connotation, control circuitry 504 compares the keyword from the message to the respective keyword of the transcription that matches the term. For example, control circuitry may perform a string comparison of the keyword from the message and the respective keyword of the transcription that matches the term. At 812, in response to control circuitry 504 determining that a term adjacent to the term that is related to the media asset is not associated with a negative connotation, control circuitry 504 refrains from comparing the keyword from the message to the respective keyword of the transcription that matches the term. For example, control circuitry may refrain from comparing the keywords because, regardless of whether or not the keywords match (indicating that the message is related to the media asset and the media asset was previously discussed in a conversation between the users), the first user may not be interested in being alerted to a message that references the media asset in a negative manner.

Figure 9:
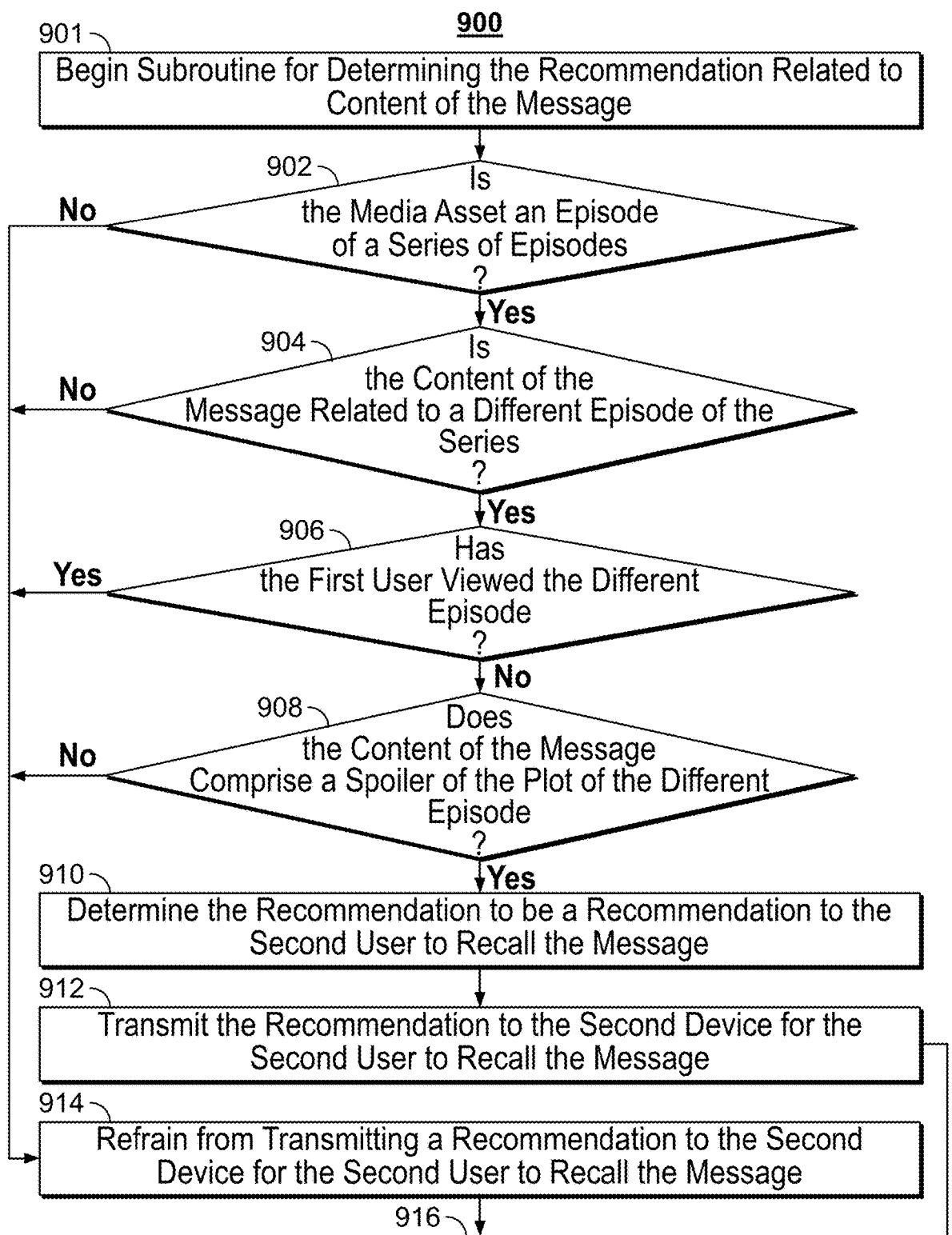
FIG. 9 depicts an illustrative flowchart of a process for determining the recommendation related to content of the message, in accordance with some embodiments of the disclosure.

FIG. 9 depicts an illustrative flowchart of a process for determining the recommendation related to content of the message, in accordance with some embodiments of the disclosure. Process 900 may be executed by control circuitry 504 (e.g., in a manner instructed to control circuitry 504 by the media guidance application). In addition, one or more steps of process 900 may be incorporated into or combined with one or more steps of any other process or embodiment (e.g., as described in relation to FIGS. 7-8 and 10-13).

Process 900 begins at 901, where control circuitry 504 begins a subroutine for determining the recommendation related to content of the message. At 902, control circuitry 504 determines whether the media asset is an episode of a series of episodes. A series of episodes may be, for example, a sequence of programs broadcast over the same channel and/or following the same storyline. In another example, the series of episodes may be a set of programs with shared attributes such as, for example, characters, actors, directors, etc. Control circuitry 504 may retrieve metadata on the media asset from media content source 616 over communications network 614 via communication path 620, where the metadata includes information such as media type, director and actor names, whether the media asset is an episode of a series of episodes, etc. For example, the metadata may be stored in a data structure where the episode field of the data structure includes an episode identifier if the media asset is an episode within a series of episodes or is empty if the media asset is not an episode within a series of episodes. Control circuitry 504 may determine that the media asset is an episode of a series of episodes if the episode field of the metadata data structure includes an episode identifier. If control circuitry 504 determines that the media asset is an episode of a series of episodes, process 900 proceeds to 904. Otherwise, process 900 proceeds to 914.

At 904, control circuitry 504 determines whether the content of the message is related to a different episode of the series. For example, control circuitry 504 may search, in the message, for numbering that indicates an episode number, such as in the message fragments "Ep 3" or "episode 03". Control circuitry 504 may search for the numbering by, for example, executing a string token matching algorithm to detect strings in the message that match a known format for episode numbering. Control circuitry 504 may determine whether the content of the message is related to a different episode of the series by comparing the episode number referenced in the message with the episode number of the media asset. In another example, control circuitry 504 may search, in the message, for episode titles, for example by comparing fragments of the message with episode titles retrieved from a database of known episode titles, e.g., from storage 508 or media guidance data source 618. Control circuitry 504 may determine whether the content of the message is related to a different episode of the series by comparing the episode title referenced in the message with the episode title of the media asset. If control circuitry 504 determines that the content of the message is related to a different episode of the series, process 900 proceeds to 906. Otherwise, process 900 proceeds to 908.

At 906, control circuitry 504 determines whether the first user has viewed the different episode of the series. For example, control circuitry 504 may check a "Previously Watched" list in a profile of the first user that is stored in, e.g., storage 508 or media guidance data source 618. User profiles are described in further detail above. Control circuitry 504 may determine that the first user has viewed the different episode of the series if the different episode is listed in the "Previously Watched" list. Control circuitry 504 may determine that the first user has not viewed the different episode of the series if the different episode is not listed in the "Previously Watched" list. If control circuitry 504 determines that the first user has viewed the different episode of the series, process 900 proceeds to step 914. Otherwise, process 900 proceeds to step 908.

At 908, control circuitry 504 determines whether the content of the message comprises a spoiler of the plot of the different episode. For example, control circuitry 504 may retrieve plot points (such as character names, narrative arc categories, etc.) of the different episode, e.g., from storage 508 or media content source 616, and search in the message for references to the plot points. Control circuitry 504 may determine that the content of the message comprises a spoiler of the plot of the different episode if it finds a reference to one of the plot points in the message. If control circuitry 504 determines that the content of the message comprises a spoiler of the plot of the different episode, process 900 proceeds to step 910. Otherwise, process 900 proceeds to step 914.

At 910, in response to determining that the content of the message comprises a spoiler of the plot of the different episode, control circuitry 504 determines the recommendation to be a recommendation to the second user to recall the message. For example, the recommendation may be for the second user to recall the message in order not to spoil the plot of the different episode for the first user. For example, the recommendation may be a textual notification, e.g., "Your message has a spoiler in it. Recommendation: recall the message." In another example, there may be a set of recommendation identifiers (e.g., "1", "2", "3", etc.) that each correspond to different potential recommendations. For example, recommendation identifier "2" may correspond to a recommendation to the second user to recall the message, and recommendation identifier "3" may correspond to a recommendation to the second user to send a reminder message. Control circuitry 504 may determine the recommendation to the second user by selecting an appropriate recommendation identifier.

At 912, control circuitry 504 transmits the recommendation to the second device for the second user to recall the message. For example, control circuitry 504 may transmit the recommendation over communications network 614 via communication path 612 to second device 604. As described above, control circuitry 504 may transmit a recommendation identifier corresponding to the recommendation to the second device for the second user to recall the message. The recommendation may be presented on the second device through, for example, a push notification or textual alert on user input interface 510 or display 512. In another example, the recommendation may be presented via an audio alert, for example through speakers 514. At 914, in response to determining that the content of the message does not comprise a spoiler of the plot of the different episode, control circuitry 504 refrains from transmitting a recommendation to the second device for the second user to recall the message. At 916, process 900 ends.

Figure 10:
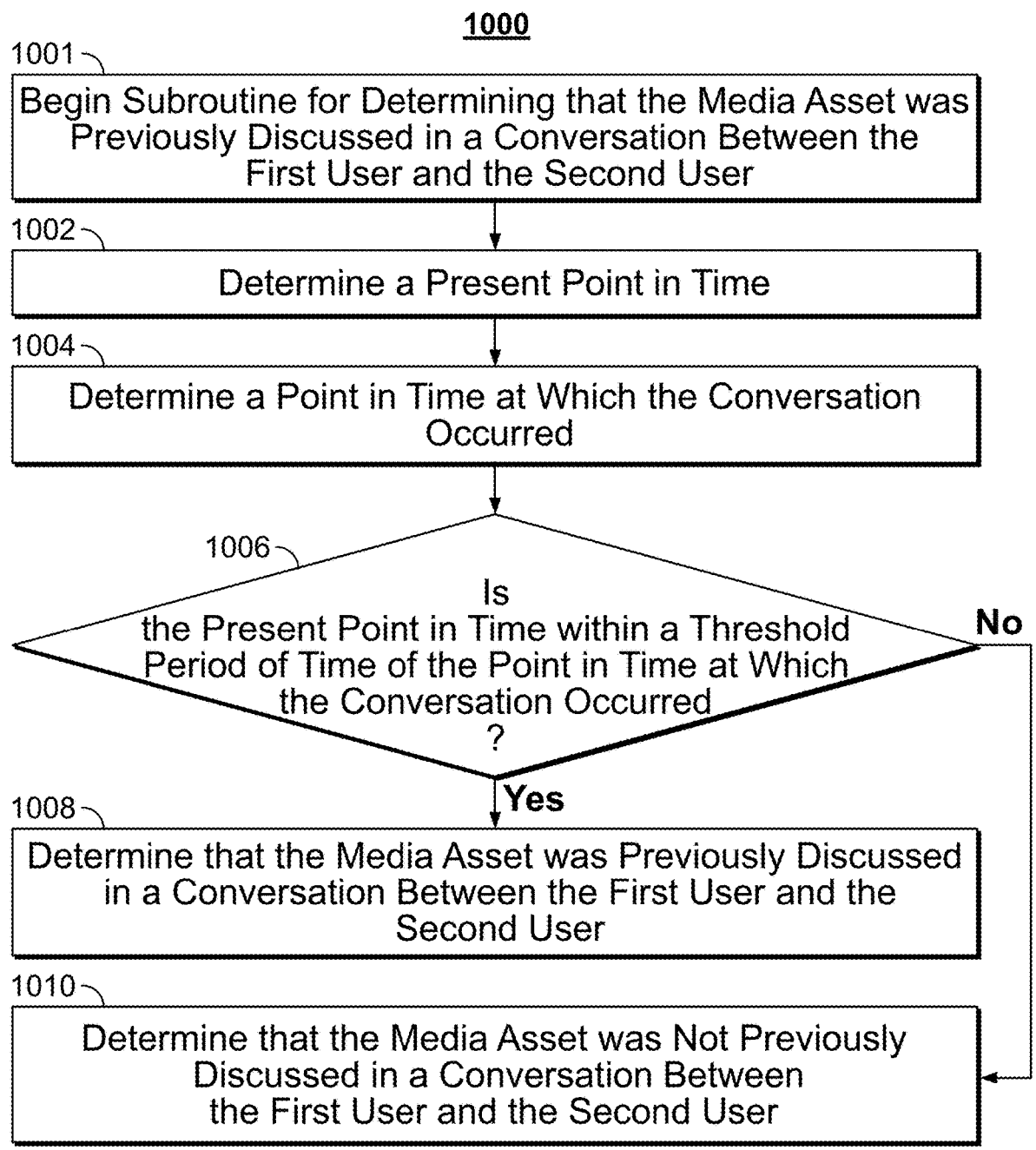
FIG. 10 depicts an illustrative flowchart of a process for determining that the media asset was previously discussed in a conversation between the first user and the second user, in accordance with some embodiments of the disclosure.

FIG. 10 depicts an illustrative flowchart of a process for determining that the media asset was previously discussed in a conversation between the first user and the second user, in accordance with some embodiments of the disclosure. Process 1000 may be executed by control circuitry 504 (e.g., in a manner instructed to control circuitry 504 by the media guidance application). In addition, one or more steps of process 1000 may be incorporated into or combined with one or more steps of any other process or embodiment (e.g., as described in relation to FIGS. 7-9 and 11-13).

Process 1000 begins at 1001, where control circuitry 504 begins a subroutine for determining that the media asset was previously discussed in a conversation between the first user and the second user. At 1002, control circuitry 504 determines a present point in time. For example, control circuitry 504 may retrieve a present point in time from media guidance data source 618. The present point in time may be represented, for example, as a timestamp data structure including month, day, year, hour, minute, second, etc.

At 1004, control circuitry 504 determines a point in time at which the conversation occurred. For example, control circuitry 504 may retrieve a timestamp of the conversation from the metadata of the transcription of the conversation. Control circuitry 504 may determine the point in time at which the conversation occurred to be any time between when the conversation began and when it ended. Control circuitry 504 may, for example, group a plurality of sequential messages into a conversation if each of the messages occurred within some time limit of each other. Control circuitry 504 may determine that the timestamp of the first message in the sequential messages is the time when the conversation began and that the timestamp of the last message in the sequential messages is the time when the conversation ended.

At 1006, control circuitry 504 determines whether the present point in time is within a threshold period of time of the point in time at which the conversation occurred. For example, control circuitry 504 may retrieve the threshold period of time from a user profile in storage 508 or media guidance data source 618. The threshold period of time value may be set by the user, for example, during a system sign-up or initiation process, or the threshold period of time value may be automatically set by the media guidance system (e.g., based on a default set by an editor). Control circuitry 504 may determine whether the present point in time is within the threshold period of time of the point in time at which the conversation occurred by calculating the difference, in time, between the present point in time and the point in time at which the conversation occurred, and determining whether the difference is less than or equal to the threshold period of time. If control circuitry 504 determines that the present point in time is within a threshold period of time of the point in time at which the conversation occurred, process 1000 proceeds to 1008. Otherwise, process 1000 proceeds to 1010.

At 1008, control circuitry 1008 determines that the media asset was previously discussed in a conversation between the first user and the second user. At 1010, control circuitry 504 determines that the media asset was not previously discussed, within the threshold period of time until the present point in time, in a conversation between the first user and the second user.

Figure 11:
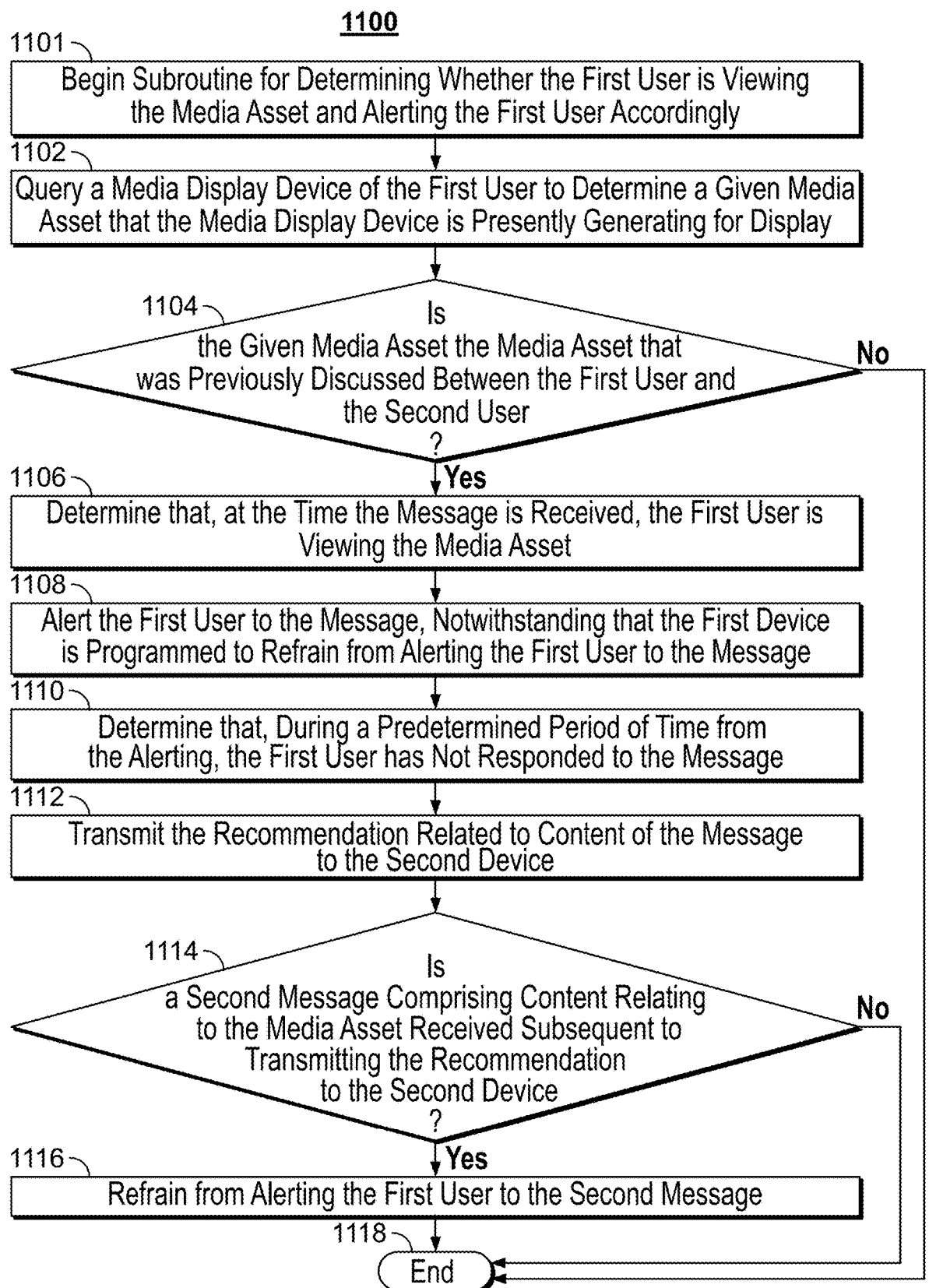
FIG. 11 depicts an illustrative flowchart of a process for determining whether the first user is viewing the media asset and alerting the first user accordingly, in accordance with some embodiments of the disclosure.

FIG. 11 depicts an illustrative flowchart of a process for determining whether the first user is viewing the media asset and alerting the first user accordingly, in accordance with some embodiments of the disclosure. Process 1100 may be executed by control circuitry 504 (e.g., in a manner instructed to control circuitry 504 by the media guidance application). In addition, one or more steps of process 1100 may be incorporated into or combined with one or more steps of any other process or embodiment (e.g., as described in relation to FIGS. 7-10 and 12-13).

Process 1100 begins at 1101, where control circuitry 504 begins a subroutine for determining whether the first user is viewing the media asset and alerting the first user accordingly. At 1102, control circuitry 504 queries a media display device of the first user to determine a given media asset that the media display device is presently generating for display. For example, control circuitry 504 may query the playback settings of the media display device to determine a given media asset that the media display device is presently generating for display. Control circuitry 504 may transmit the query to storage 508, media guidance data source 618, or another location where the playback settings of the first device are stored. The query may be transmitted over communications network 614. For example, after transmitting the query, control circuitry 504 may determine that the first device is presently generating for display a given media asset if the control circuitry receives a response to the query indicating that the media display device is presently generating for display the media asset. For example, control circuitry 504 may receive, in response to the query, a media asset identifier of the media asset that the media display device is presently playing back and generating for display at the media display device.

At 1104, control circuitry 504 determines whether the given media asset is the media asset that was previously discussed between the first user and the second user. For example, control circuitry 504 may determine a keyword corresponding to the given media asset, for example, by retrieving the keyword from a database of keywords corresponding to media assets (e.g., in storage 508 or media guidance data source 618). As discussed above, control circuitry 504 may determine whether the given media asset is the media asset that was previously discussed between the first user and the second user by, for example, accessing a database comprising a transcription of a conversation between the first user and the second user. Control circuitry 504 may compare the keyword corresponding to the given media asset to a keyword, of the transcription, that is related to the media asset. As described above, if the keywords match, control circuitry 504 may determine that the given media asset is the media asset that was previously discussed between the first user and the second user. If control circuitry 504 determines that the given media asset is the media asset that was previously discussed between the first user and the second user, process 1100 proceeds to 1106. Otherwise, process 1100 proceeds to 1118. At 1106, control circuitry 504 determines that, at the time the message is received, the first user is viewing the media asset.

At 1108, control circuitry 504 alerts the first user to the message, notwithstanding that the first device is programmed to refrain from alerting the first user to the message. As described above, alerting the user to the message may include, for example, generating for display a notification (e.g., on user input interface 510 or display 512), generating an audio output (e.g., through speakers 514), causing the device to vibrate, turning on a screen of the device (e.g., on display 512), etc. In one example, after alerting the first user to the message, control circuitry 504 may prompt the first user to respond to the message with a snapshot of, for example, displayed media content on the first user device. The snapshot may include a specific scene that the first user is presently viewing, as well as additional content, such as a link to a clip of the scene.

At 1110, control circuitry 504 determines that, during a predetermined period of time from the alerting, the first user has not responded to the message. For example, control circuitry 504 may access an activity log of the first device (e.g., at storage 508 or media guidance data source 618) and search through the logged activities of a given time period, e.g., between the time at which the first user received the message and the present point in time. For example, control circuitry 504 may determine whether the activity log has logged, in the given time period, an outgoing message to the second user.

At 1112, control circuitry 504 transmits the recommendation related to content of the message to the second device. As described above, control circuitry 504 may transmit the recommendation over communications network 614 via communication path 612 to second device 604. The recommendation may be presented on the second device through, for example, a push notification or textual alert on user input interface 510 or display 512. In another example, the recommendation may be presented via an audio alert, for example through speakers 514.

At 1114, control circuitry 504 determines whether a second message comprising content relating to the media asset is received subsequent to transmitting the recommendation to the second device. For example, control circuitry 504 may, for any messages received at the first device from the second device subsequent to transmitting the recommendation to the second device, determine whether the second message comprises content relating to the media asset through a method described above. If control circuitry 504 determines that a second message comprising content relating to the media asset is received subsequent to transmitting the recommendation to the second device, the process proceeds to 1116. Otherwise, process 1100 proceeds to 1118.

At 1116, control circuitry 504 refrains from alerting the first user to the second message. At 1118, process 1100 ends.

Figure 12:
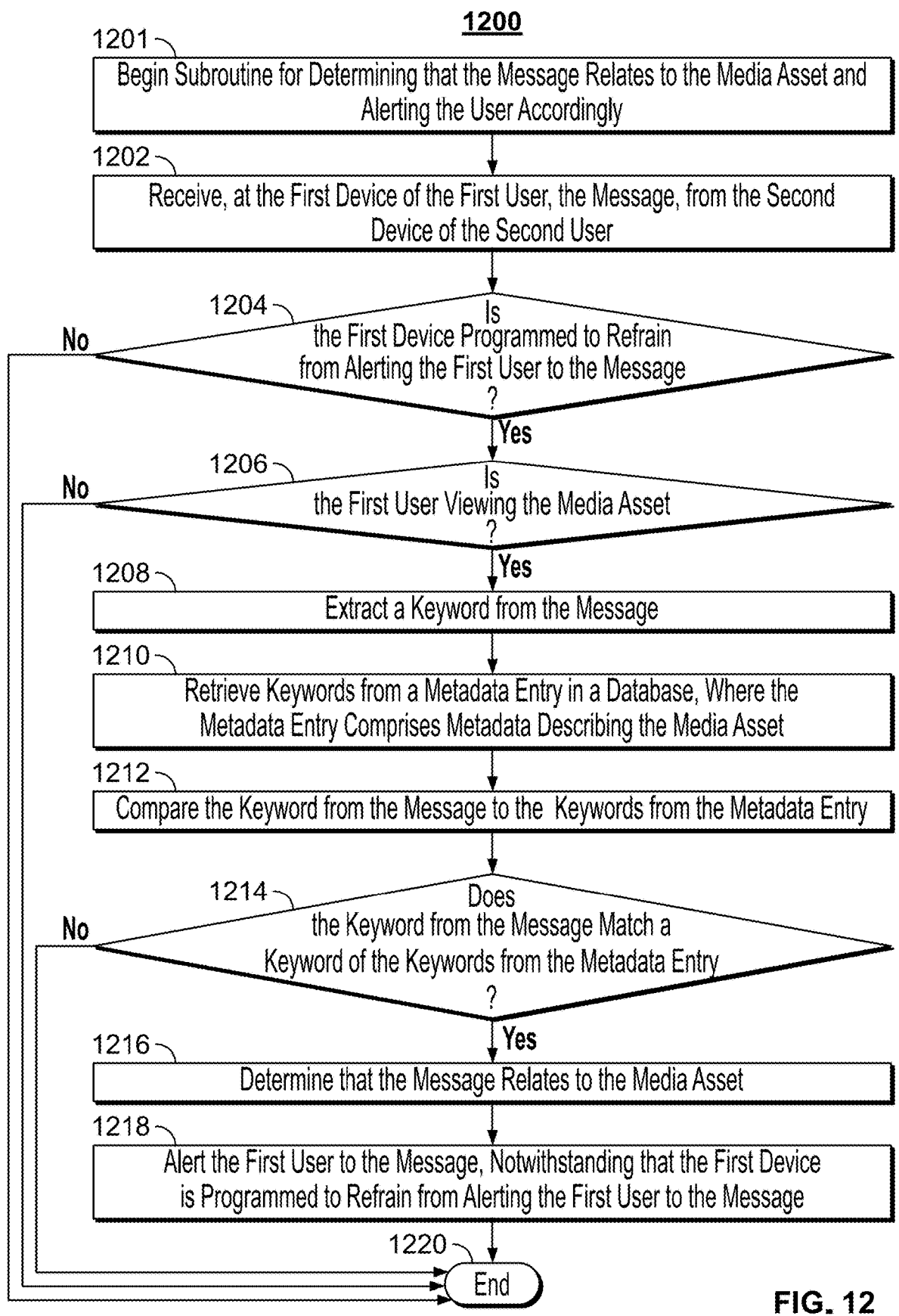
FIG. 12 depicts an illustrative flowchart of a process for determining that the message relates to the media asset and alerting the user accordingly, in accordance with some embodiments of the disclosure.

FIG. 12 depicts an illustrative flowchart of a process for determining that the message relates to the media asset and alerting the user accordingly, in accordance with some embodiments of the disclosure. Process 1200 may be executed by control circuitry 504 (e.g., in a manner instructed to control circuitry 504 by the media guidance application). In addition, one or more steps of process 1200 may be incorporated into or combined with one or more steps of any other process or embodiment (e.g., as described in relation to FIGS. 7-11 and 13).

Process 1200 begins at 1201, where control circuitry 504 begins a subroutine for determining that the message relates to the media asset and alerting the user accordingly. At 1202, control circuitry 504 receives, at the first device of the first user, the message, from the second device of the second user. As described above, for example, the second device may transmit the message over a protocol such as the Internet's Simple Mail Transfer Protocol (SMTP), Advanced Message Queueing Protocol (AMQP), Message Queue Telemetry Transport (MQTT), or another messaging protocol. In some embodiments, control circuitry 504 may receive the message at the first device over communications network 614.

At 1204, control circuitry 504 determines whether the first device is programmed to refrain from alerting the first user to the message. As described above, control circuitry 504 may query the device settings of the first device to determine whether the device is set to, e.g., a do-not-disturb or silent mode, and based on determining that the device is set to, e.g., a do-not-disturb or silent mode, control circuitry 504 may determine that the first device is programmed to refrain from alerting the first user to the message. If control circuitry 504 determines that the first device is programmed to refrain from alerting the first user to the message, process 1200 proceeds to 1206. Otherwise, process 1200 proceeds to 1220.

At 1206, control circuitry 504 determines whether the first user is viewing the media asset. As described above, control circuitry 504 may determine whether the first user is viewing the media asset by querying a media display device of the first user to determine a given media asset that the media display device is presently generating for display, and determining whether the given media asset matches the media asset. Control circuitry 504 may determine whether the given media asset matches the media asset by, for example, comparing unique identifiers of the media assets. Methods for determining whether the first user is viewing the media asset are described in further detail below. If control circuitry 504 determines that the first user is viewing the media asset, process 1200 proceeds to 1208. Otherwise, process 1200 proceeds to 1220.

At 1208, control circuitry 504 extracts a keyword from the message. As described above, control circuitry 504 may extract the keyword by executing a natural language processing algorithm to extract the keyword from the message.

At 1210, control circuitry 504 retrieves keywords from a metadata entry in a database, where the metadata entry comprises metadata describing the media asset. For example, the database may be located in storage 508, media content source 616, or media guidance data source 618. The metadata describing the media asset may include, for example, keywords corresponding to characters, actors, directors, producers, genre, channel, media asset type (e.g., video, audio), etc.

At 1212, control circuitry 504 compares the keyword from the message to the keywords from the metadata entry. At 1214, control circuitry 504 determines whether the keyword from the message matches a keyword of the keywords from the metadata entry. As described above, control circuitry 504 may determine whether there is a partial or full match between the keywords by using a fuzzy logic method. If control circuitry 504 determines that the keyword from the message matches a keyword of the keywords from the metadata entry, process 1200 proceeds to 1216. Otherwise, process 1200 proceeds to 1220.

At 1216, based on determining that the keyword from the message matches a keyword of the keywords from the metadata entry, control circuitry 504 determines that the message relates to the media asset. At 1218, control circuitry 504 alerts the first user to the message, notwithstanding that the first device is programmed to refrain from alerting the first user to the message. As described above, alerting the user to the message may include, for example, generating for display a notification (e.g., on user input interface 510 or display 512), generating an audio output (e.g., through speakers 514), causing the device to vibrate, turning on a screen of the device (e.g., on display 512), etc. At 1220, process 1200 ends.

Figure 13:
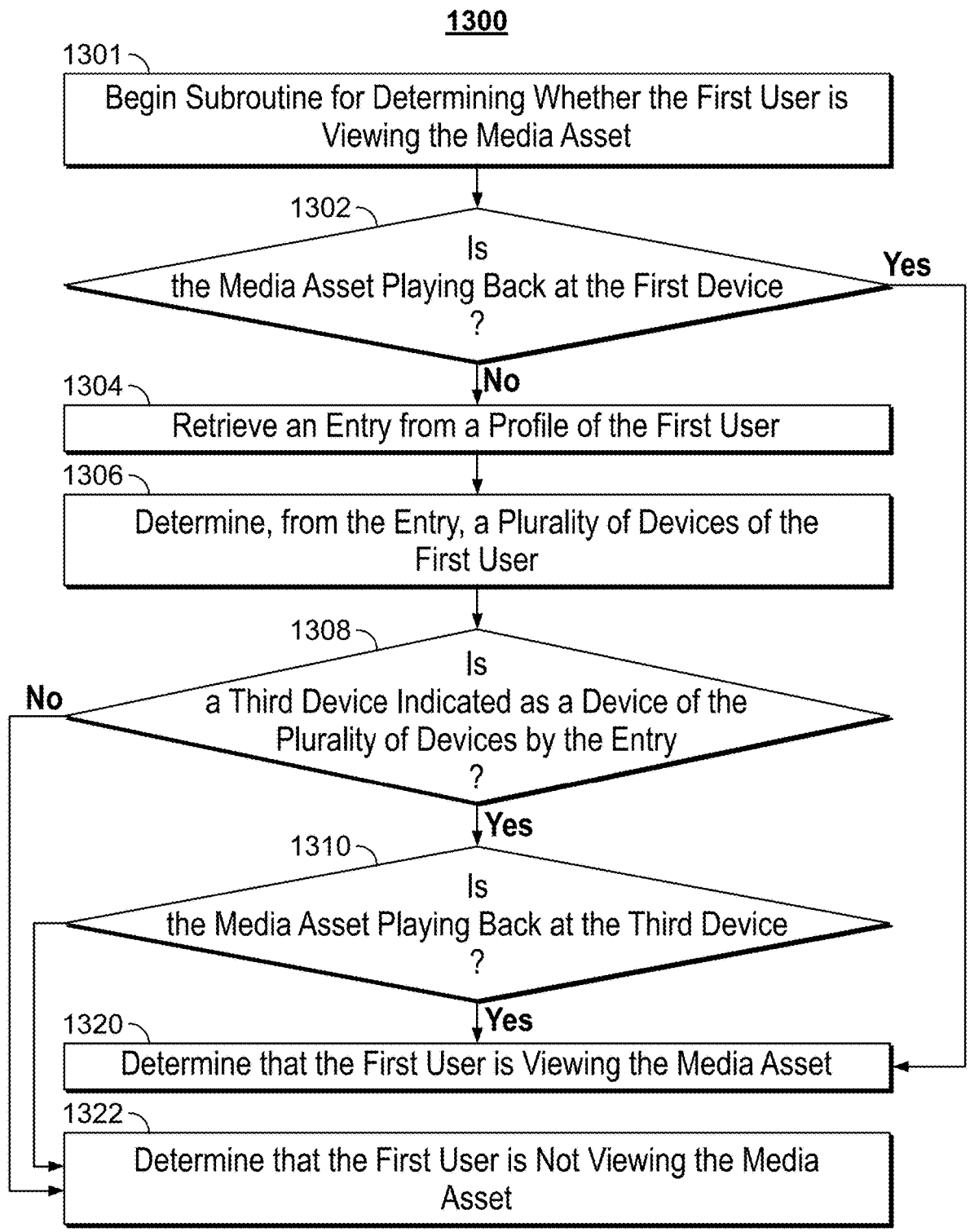
FIG. 13 depicts an illustrative flowchart of a process for determining whether the first user is viewing the media asset, in accordance with some embodiments of the disclosure.

FIG. 13 depicts an illustrative flowchart of a process for determining whether the first user is viewing the media asset, in accordance with some embodiments of the disclosure. Process 1300 may be executed by control circuitry 504 (e.g., in a manner instructed to control circuitry 504 by the media guidance application). In addition, one or more steps of process 1300 may be incorporated into or combined with one or more steps of any other process or embodiment (e.g., as described in relation to FIGS. 7-12).

Process 1300 begins at 1301, where control circuitry 504 begins a subroutine for determining whether the first user is viewing the media asset. At 1302, control circuitry 504 determines whether the media asset is playing back at the first device. For example, control circuitry 504 may retrieve (e.g., from storage 508, media content source 616, or media guidance data source 618) a given media asset identifier for the media asset. For example, as described above, control circuitry 504 may query the playback settings of the first device to determine a given media asset that the first device is presently generating for display. For example, control circuitry 504 may receive, in response to the query, a media asset identifier of the media asset that the first device is presently playing back and generating for display at the media display device. Control circuitry 504 may compare the media asset identifier of the media asset that the first device is presently playing back with the given media asset identifier. If control circuitry 504 determines that the media asset is playing back at the first device, process 1300 proceeds to 1320. Otherwise, process 1300 proceeds to 1304.

At 1304, control circuitry 504 retrieves an entry from a profile of the first user. For example, the profile of the first user may be retrieved from storage 508 or media guidance data source 618. The entries in the profile of the first user may include information on, for example, contacts of the user, user activity logs, user preferences, known devices associated with the user, etc.

At 1306, control circuitry 504 determines, from the entry, a plurality of devices of the first user. For example, the entry may list the plurality of devices in a data structure that stores, for example, device identifiers, device IP addresses, etc.

At 1308, control circuitry 504 determines whether a third device is indicated as a device of the plurality of devices by the entry. For example, control circuitry 504 may determine whether the plurality of devices includes any device that is not the first device. If control circuitry 504 determines that a third device is indicated as a device of the plurality of devices by the entry, process 1300 proceeds to 1310. Otherwise, process 1300 proceeds to 1322.

At 1310, control circuitry 504 determines whether the media asset is playing back at the third device. For example, as described above, control circuitry 504 may retrieve (e.g., from storage 508, media content source 616, or media guidance data source 618) a given media asset identifier for the media asset. For example, as described above, control circuitry 504 may query the playback settings of the third device to determine a given media asset that the third device is presently generating for display. For example, control circuitry 504 may receive, in response to the query, a media asset identifier of the media asset that the third device is presently playing back and generating for display. Control circuitry 504 may compare the media asset identifier of the media asset that the third device is presently playing back with the given media asset identifier. If control circuitry 504 determines that the media asset is playing back at the third device, process 1300 proceeds to 1320. In some embodiments, control circuitry 504 may select additional devices of the plurality of devices and determine whether the media asset is playing back at the additional devices. If the media asset is not playing back at the third device or the additional devices, process 1300 proceeds to 1322.

At 1320, in response to determining that the media asset is playing back at the third device, control circuitry 504 determines that the first user is viewing the media asset. At 1322, in response to determining that the media asset is not playing back at the third device (or, in some embodiments, at any of the plurality of devices associated with the first user), control circuitry 504 determines that the first user is not viewing the media asset.

What is claimed is:

1. A method of selectively generating alerts, the method comprising:
   receiving, at a first device, a message from a second device; and
   while an alert prevention mode is active on the first device:
      determining that a content item is being presented, wherein the content item is one episode of a series of episodes;
      determining that the message is related to a prior communication between the first device and the second device;
      determining that the prior communication is related to the content item and the series; and
      in response to the determining that (i) the message is related to the prior communication and (ii) the prior communication is related to the content item and the series, overriding the alert prevention mode, wherein the overriding comprises causing the first device to generate an alert based on the message and the prior communication.

2. The method of claim 1, wherein determining that the message is related to the prior communication comprises:
   extracting a keyword from the message;
   retrieving, from a database, a transcription of the prior communication;
   determining whether the transcription comprises the keyword; and in response to determining that the transcription comprises the keyword, determining that the message is related to the prior communication.

3. The method of claim 2, wherein the extracting the keyword from the message comprises executing natural language processing.

4. The method of claim 2, wherein the determining that the transcription comprises the keyword comprises determining that the keyword from the message matches a keyword of the transcription.

5. The method of claim 1, wherein the determining that the message is related to the prior communication comprises:
determining a current time point;
determining a second time point at which the prior communication occurred; and
in response to determining that the current time point is within a threshold period from the second time point, determining that that the message is related to the prior communication.

6. The method of claim 1, wherein the overriding the alert prevention mode comprises generating at least one of a display alert, an audio alert, and a vibration alert.

7. The method of claim 1, further comprising determining, during a predetermined period of time from the overriding the alert prevention mode, that the first device has not transmitted a response to the message.

8. The method of claim 1,
wherein the alert is further based on the content item being presented.

9. The method of claim 1, further comprising:
determining that the message relates to a different episode of the series; and
in response to the determining that the message relates to the different episode, generating, for transmission to the second device, a recommendation to recall the message.

10. The method of claim 1, wherein determining that the content item is being presented comprises:
retrieving an entry from a profile;
determining, from the entry, a plurality of devices associated with the profile; and
determining that the content item is being presented on a third device of the plurality of devices.

11. A system for selectively generating alerts, the system comprising:
communications circuitry configured to transmit and receive data; and
control circuitry, coupled to the communications circuitry, configured to:
receive, at a first device via the communications circuitry, a message from a second device; and
while an alert prevention mode is active on the first device:
determine that a content item is being presented, wherein the content item is one episode of a series of episodes;
determine that the message is related to a prior communication between the first device and the second device;
determine that the prior communication is related to the content item and the series; and
in response to determining that (i) the message is related to the prior communication and (ii) the prior communication is related to the content item and the series, override the alert prevention mode, wherein overriding the alert prevention mode comprises causing the first device to generate an alert based on the message and the prior communication.

12. The system of claim 11, wherein the control circuitry is configured to determine that the message is related to the prior communication by:
extracting a keyword from the message;
retrieving, from a database, a transcription of the prior communication;
determining whether the transcription comprises the keyword; and
in response to determining that the transcription comprises the keyword, determining that the message is related to the prior communication.

13. The system of claim 12, wherein the control circuitry is configured to extract the keyword from the message by executing natural language processing.

14. The system of claim 12, wherein the control circuitry is configured to determine that the transcription comprises the keyword by determining that the keyword from the message matches a keyword of the transcription.

15. The system of claim 11, wherein the control circuitry is configured to determine that the message is related to the prior communication by:
determining a current time point;
determining a second time point at which the prior communication occurred; and
in response to determining that the current time point is within a threshold period from the second time point, determining that that the message is related to the prior communication.

16. The system of claim 11, wherein the control circuitry is configured to override the alert prevention mode by generating at least one of a display alert, an audio alert, and a vibration alert.

17. The system of claim 11, wherein the control circuitry is further configured to determine, during a predetermined period of time from overriding the alert prevention mode, that the first device has not transmitted a response to the message.

18. The system of claim 11,
wherein the alert is further based on the content item being presented.

19. The system of claim 11, wherein the control circuitry is further configured to:
determine that the message relates to a different episode of the series; and
in response to determining that the message relates to the different episode, generate, for transmission to the second device, a recommendation to recall the message.

20. The system of claim 11, wherein the control circuitry is configured to determine that the content item is being presented by:
retrieving an entry from a profile;
determining, from the entry, a plurality of devices associated with the profile; and
determining that the content item is being presented on a third device of the plurality of devices.

* * * * *